(12) United States Patent
Minamitani

(10) Patent No.: US 12,474,253 B2
(45) Date of Patent: Nov. 18, 2025

(54) CORROSIVE ENVIRONMENT MONITORING SYSTEM AND CORROSIVE ENVIRONMENT MONITORING METHOD

(71) Applicant: Hitachi, Ltd., Tokyo (JP)

(72) Inventor: Rintarou Minamitani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 220 days.

(21) Appl. No.: 18/028,769

(22) PCT Filed: Sep. 8, 2021

(86) PCT No.: PCT/JP2021/033009
§ 371 (c)(1),
(2) Date: Mar. 28, 2023

(87) PCT Pub. No.: WO2022/091590
PCT Pub. Date: May 5, 2022

(65) Prior Publication Data
US 2023/0333003 A1    Oct. 19, 2023

(30) Foreign Application Priority Data

Oct. 27, 2020 (JP) ................................. 2020-179987

(51) Int. Cl.
*G01N 17/04* (2006.01)
*G01N 27/20* (2006.01)
(52) U.S. Cl.
CPC ............. *G01N 17/04* (2013.01); *G01N 27/20* (2013.01)
(58) Field of Classification Search
CPC ......... G01N 17/00; G01N 17/04; G01N 27/20
See application file for complete search history.

(56) References Cited

U.S. PATENT DOCUMENTS

| 2012/0176148 A1 | 7/2012 | Chey et al. |
| 2016/0313232 A1* | 10/2016 | Balmond .......... B29C 45/14836 |
| 2018/0259442 A1* | 9/2018 | Minamitani ........... G01N 17/04 |

FOREIGN PATENT DOCUMENTS

| IN | 201817041228 A | 3/2019 |
| JP | 63305232 A | 12/1988 |

(Continued)

OTHER PUBLICATIONS

Espacenet English translation of JP2008058253 a Environmental Measuring Element and Environmental Evaluation Method (Year: 2008).*

(Continued)

*Primary Examiner* — Eman A Alkafawi
*Assistant Examiner* — Courtney G Mcdonnough
(74) *Attorney, Agent, or Firm* — MATTINGLY & MALUR, PC

(57) ABSTRACT

Prepared is a layered body comprising: an insulation plate; a base metal thin film formed on the insulation plate; and a sensing metal thin film which is formed on at least a partial area of the base metal thin film, is more easily corroded by a corrosive substance than the base metal thin film, and has a lower resistance value than the base metal thin film. A corrosive environment monitoring sensor includes this layered body, and has an opening unit in a side surface direction, and a case having a gas passage of a corrosive substance therein. The present invention detects electric resistance between two positions on the base thin film of this sensor, and determines the type of the corrosive substance from a temporal change of the electric resistance.

5 Claims, 7 Drawing Sheets

(56) References Cited

FOREIGN PATENT DOCUMENTS

| | | | | |
|---|---|---|---|---|
| JP | 2003294606 A | | 10/2003 | |
| JP | 2008058253 A | * | 3/2008 | ............. G01N 27/12 |
| JP | 2014153089 A | | 8/2014 | |
| JP | 2019113433 A | | 7/2019 | |
| WO | 2017061182 A1 | | 4/2017 | |
| WO | 2020039611 A1 | | 2/2020 | |

OTHER PUBLICATIONS

International Search Report of PCT/JP2021/033009 dated Nov. 16, 2021.
Indian Office Action received in corresponding Indian Application No. 202317030105 dated Jun. 26, 2025.

* cited by examiner

CORROSIVE ENVIRONMENT MONITORING SYSTEM AND CORROSIVE ENVIRONMENT MONITORING METHOD

TECHNICAL FIELD

The present invention relates to a corrosive environment monitoring system and a corrosive environment monitoring method.

BACKGROUND ART

An operation stoppage of equipment in social infrastructures such as electric power, sewer systems, and plants due to a failure affects social activities, and it is thus required to stably operate the equipment. In particular, in equipment operating in a severe corrosive environment, it is important to ensure corrosion resistance of the equipment itself as well as corrosion resistance of electronic devices such as information devices and control devices attached to the equipment.

Although appropriate anticorrosion measures are taken for electronic devices provided attached to equipment in which a corrosion failure is assumed, there is a possibility a new corrosion failure occurs in equipment for which an installation experience is not much and anticorrosion measures are insufficient. In order to take appropriate anticorrosion measures in such equipment, it is effective to measure and diagnose a local environment, and it is desired to continuously monitor the corrosive environment with a device that monitors corrosiveness of the environment over a long period of time.

Conventionally, a device described in PTL 1 has been proposed as a corrosive environment monitoring device used for such an application.

PTL 1 discloses, as a sensor for monitoring a corrosive environment, a configuration including a first metal thin film that is difficult to be corroded by a corrosive gas and a second metal thin film that is easily corroded in a housing having an opening on one surface and of which surfaces other than the opening are sealed.

In the technology described in PTL 1, an external voltage or a current is applied to the first metal thin film of the sensor, and a change in electric resistance corresponding to a corrosion state of the second metal thin film is measured, whereby a corrosive substance generation state in the environment can be acquired.

CITATION LIST

Patent Literature

PTL 1: WO 2017/061182 A

SUMMARY OF INVENTION

Technical Problem

With the corrosive environment monitoring device using the sensor described in PTL 1, it is possible to predict the degree of corrosion risk in a component in an information device or a control device installed at a site where the sensor is installed from a change in electric resistance corresponding to the corrosion state of the second metal thin film.

However, with the conventional sensor described in PTL 1, it is difficult to detect a gas type that causes corrosion even though it is known that the corrosion occurs in the local environment.

Conventionally, in order to detect a gas type that causes corrosion, it has been necessary to take gas in the environment from the site and analyze the gas with a special instrument. Therefore, there is a problem that an engineer having a special skill in gas analysis is required and it takes a long time to complete the diagnosis. For example, in a case where a measurement target plant is located overseas, a period of about one month may be required for gas transportation and analysis.

Therefore, there has been a demand for quickly identifying the type of a gas generated in an environment where the sensor is installed and diagnosing a corrosion risk due to the corrosive gas on site or remotely without requiring special skills. However, if an analytical instrument for the corrosive gas is brought to the site to identify the gas type, the corrosion risk can be diagnosed more correctly. However, since the analytical instrument cannot be brought to various environments, it is extremely difficult to correctly diagnose the corrosion risk in a remote place such as overseas.

It has been desired to implement a corrosive environment monitoring system and a corrosive environment monitoring method capable of not only monitoring corrosiveness of an environment but also diagnosing a gas type and the like.

Solution to Problem

In order to solve the above problem, for example, the configuration described in the claims is adopted.

The present application includes a plurality of means for solving the above-described problems, and an example thereof is a corrosive environment monitoring system including: a corrosive environment monitoring sensor that includes a laminate including an insulating plate, a base metal thin film formed on the insulating plate, and a sensing metal thin film formed in at least a partial region of the base metal thin film and formed of a metal that is more easily corroded by a corrosive substance compared to the base metal thin film and has a lower resistance value than the base metal thin film, and a housing that encloses the laminate, has an opening in a side surface direction, and has a gas passage for the corrosive substance inside; a resistance value measurement unit that detects an electric resistance between two points on the base metal thin film of the corrosive environment monitoring sensor; and a determination unit that determines a type of the corrosive substance based on a change in electric resistance measured by the resistance value measurement unit over time.

Advantageous Effects of Invention

According to the present invention, it is possible to determine the type of a corrosive substance in an environment where the corrosive environment monitoring sensor is installed from data measured using the corrosive environment monitoring sensor.

Therefore, analysis work for determining the type of the corrosive substance, which has been required in the related art, and special skills necessary for the analysis are not required, and it is possible to reduce labor and cost required for determining the type of the corrosive substance in the environment.

Problems, configurations, and effects other than those described above will become apparent by the following description of embodiments.

DESCRIPTION OF EMBODIMENTS

Hereinafter, an embodiment of the present invention (hereinafter, referred to as "present embodiment") will be described with reference to the accompanying drawings.
<System Configuration>

Figure 1:
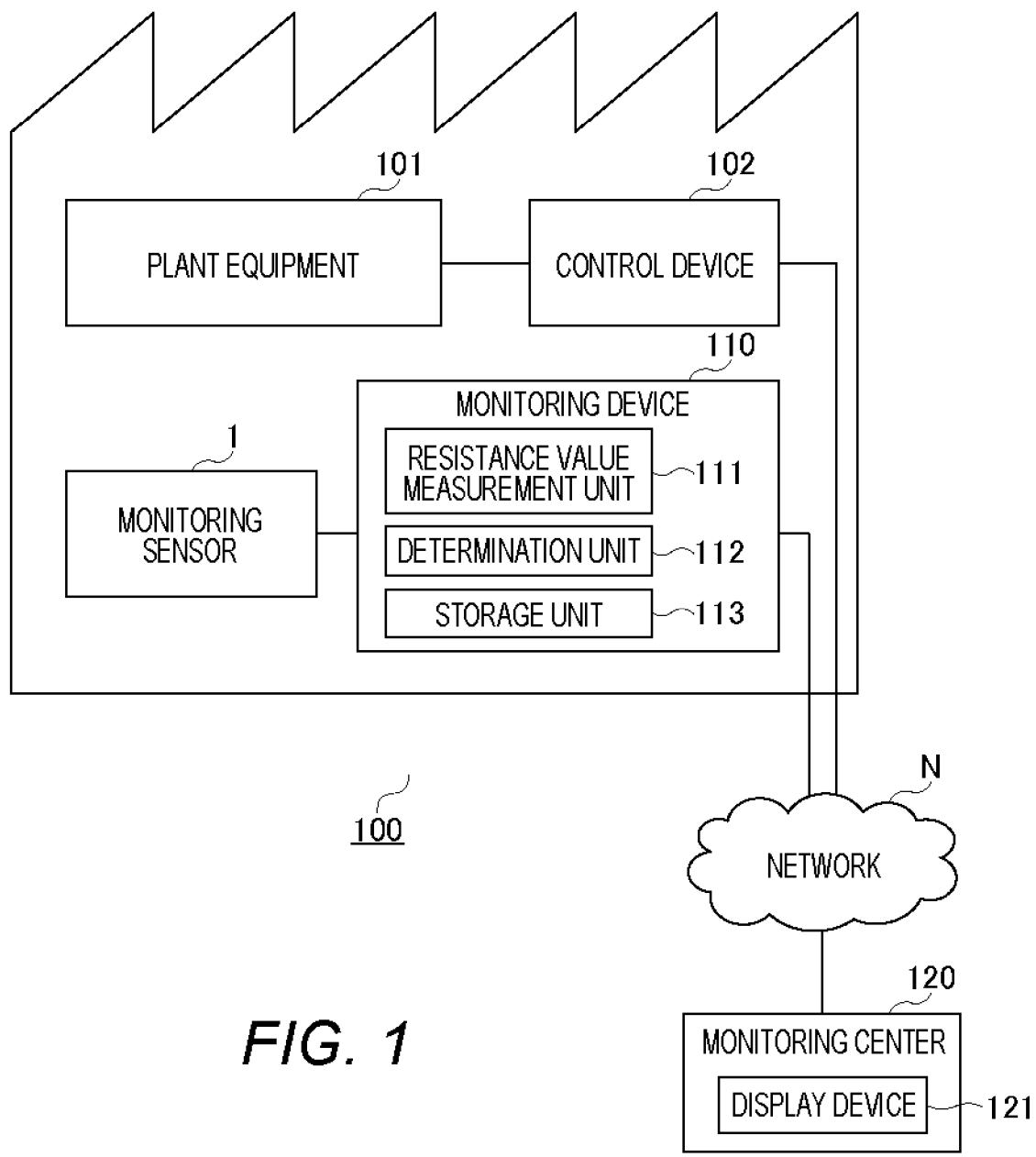
FIG. 1 is a diagram illustrating an overall configuration of a corrosive environment monitoring system according to an embodiment of the present invention.

FIG. 1 illustrates an overall configuration of a corrosive environment monitoring system 100 of the present embodiment.

The example illustrated in FIG. 1 is a configuration in which an environment in a factory where plant equipment 101 is installed is measured by the corrosive environment monitoring system 100. That is, the plant equipment 101 is configured to operate under the control of a control device 102. In the factory where the control device 102 is installed, a corrosive environment monitoring sensor 1 and a corrosive environment monitoring device 110 connected to the corrosive environment monitoring sensor 1 are installed.

The corrosive environment monitoring device 110 and the control device 102 are connected to a monitoring center 120 via a network N. The monitoring center 120 includes a display device 121, and a state of monitoring of a corrosive environment which is the environment in the factory and an operating state of the plant equipment 101 are displayed on the display device 121.

The corrosive environment monitoring device 110 includes a resistance value measurement unit 111, a determination unit 112, and a storage unit 113.

The resistance value measurement unit 111 measures an electric resistance value of a base metal thin film 2 (FIGS. 3 and 4) arranged in the corrosive environment monitoring sensor 1.

The determination unit 112 determines a state of the corrosive environment and determines a gas type that is the type of a corrosive substance based on a change in electric resistance value measured by the resistance value measurement unit 111.

The storage unit 113 stores the change in electric resistance value measured by the resistance value measurement unit 111. The storage unit 113 also stores information indicating a relationship between the change in resistance value and a corrosion thickness.

The information indicating the relationship between the change in electric resistance value and the corrosion amount is called calibration curve data, and in the present embodiment, the calibration curve information is stored in the storage unit 113 for a plurality of corrosive substances.

As described above, the information regarding the gas type and the state of the corrosive environment determined by the determination unit 112 in the corrosive environment monitoring device 110 is stored in the storage unit 113. Then, the information regarding the gas type and the state of the corrosive environment in the storage unit 113 is transmitted to the monitoring center 120 via the network N and displayed on the display device 121 in the monitoring center 120. Note that the corrosive environment monitoring device 110 may display the gas type and the corrosive environment.
<Configuration of Corrosive Environment Monitoring Sensor>

Figure 2:
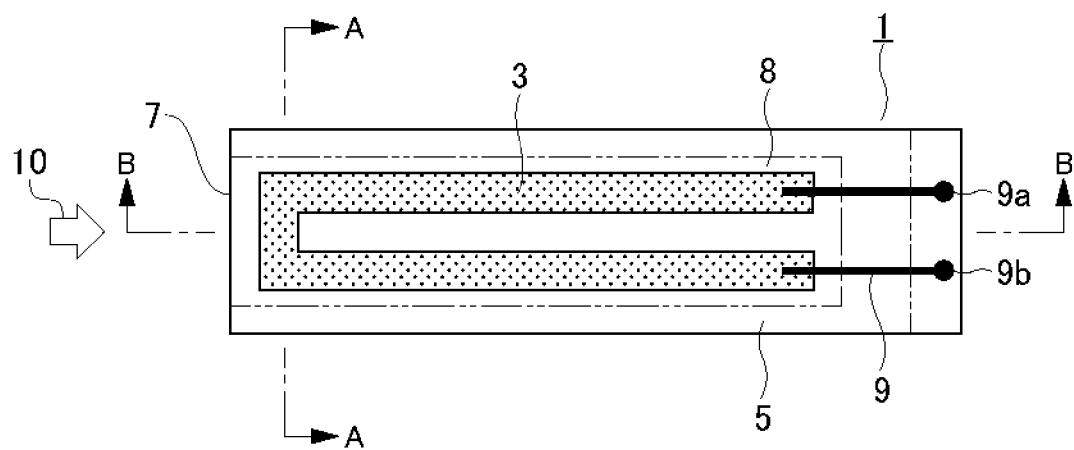
FIG. 2 is a top view illustrating a configuration example (Example 1) of a corrosive environment monitoring sensor according to an embodiment of the present invention.

FIG. 2 is a top view illustrating an example (Example 1) of a configuration of the corrosive environment monitoring sensor 1 of the present embodiment. In the top view of FIG. 2, a housing 6 over a substrate 5 is indicated by a virtual line.

Figure 3:
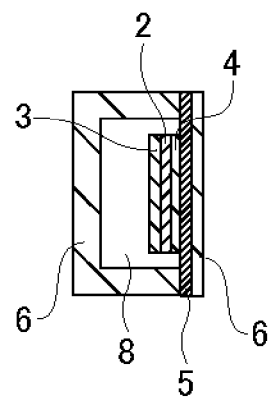
FIG. 3 is a cross-sectional view taken along line A-A, illustrating the configuration example (Example 1) of the corrosive environment monitoring sensor according to an embodiment of the present invention.

FIG. 3 is a cross-sectional view taken along line A-A in FIG. 2.

Figure 4:
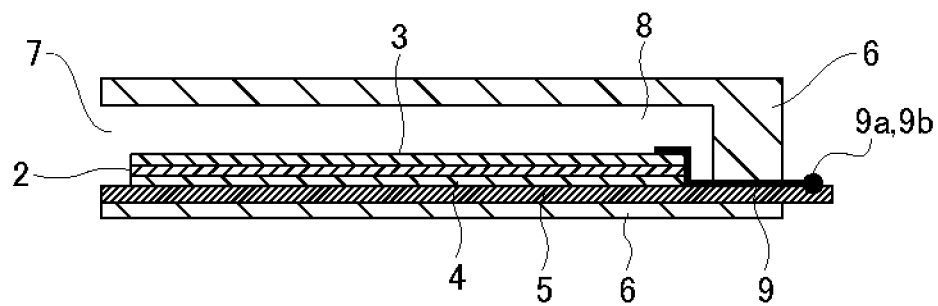
FIG. 4 is a cross-sectional view taken along line B-B, illustrating the configuration example (Example 1) of the corrosive environment monitoring sensor according to an embodiment of the present invention.

FIG. 4 is a cross-sectional view taken along line B-B in FIG. 2.

In the corrosive environment monitoring sensor 1, the base metal thin film 2 is arranged on the laterally long substrate 5 via an insulating plate 4, and a sensing metal thin film 3 is arranged in the entire region on the base metal thin film 2 as a support member.

A corrosive gas 10 flows into the corrosive environment monitoring sensor 1 from an opening 7 on a left end side of the laterally long substrate 5 illustrated in FIG. 2.

The base metal thin film 2 and the sensing metal thin film 3 are formed in a U-shape in which two sides are arranged in parallel along a long side of the substrate 5, and ends close to the opening 7 are connected.

The base metal thin film 2 is formed of a material such as stainless steel or chromium that is more difficult to be corroded by the corrosive gas 10 existing in the environment as compared to the sensing metal thin film 3.

The sensing metal thin film 3 is formed of a material, such as silver, which is more easily corroded by the corrosive gas 10 as compared to the base metal thin film 2.

An upper surface of the substrate 5 on which the base metal thin film 2 and the sensing metal thin film 3 are arranged and a lower surface of the substrate 5 are covered with the housing 6. However, as illustrated in FIGS. 2 and 4, the opening 7 in which the housing 6 is not arranged is formed at a left end of the housing 6, and the corrosive gas 10 flows into a gas passage 8 inside the corrosive environment monitoring sensor 1. That is, the sensing metal thin film 3 is exposed in the gas passage 8.

In the corrosive environment monitoring sensor 1, the substrate 5 protrudes from a right end of the housing 6 as illustrated in FIG. 4. An extraction electrode 9 is connected to right ends of the base metal thin film 2 having two sides arranged in parallel, and terminals 9a and 9b at a tip of the extraction electrode 9 are arranged on the substrate 5 protruding from the housing 6.

The resistance value measurement unit 111 of the corrosive environment monitoring device 110 illustrated in FIG. 1 measures an electric resistance value between the terminals 9a and 9b.

Figure 5:
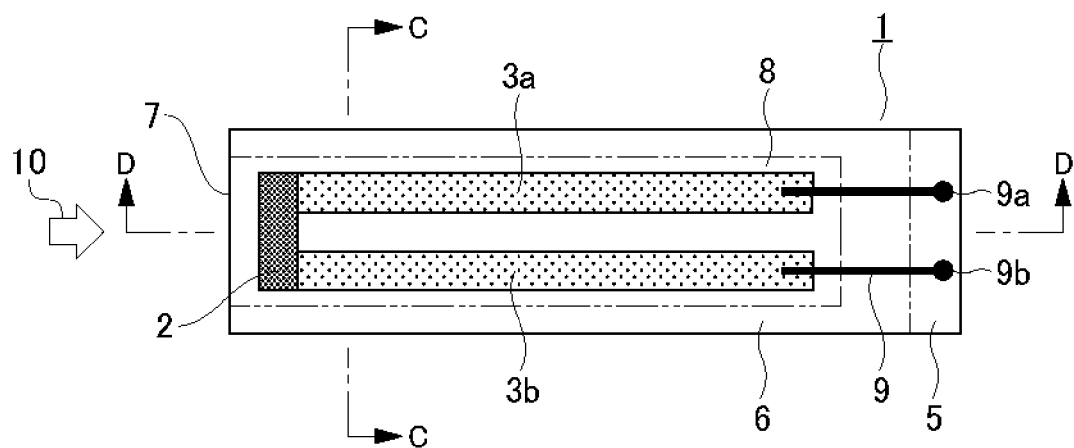
FIG. 5 is a top view illustrating a configuration example (Example 2) of the corrosive environment monitoring sensor according to an embodiment of the present invention.

FIG. 5 is a top view illustrating another configuration example (Example 2) of the corrosive environment monitoring sensor 1 of the present embodiment. In the top view of FIG. 5, the housing 6 over the substrate 5 is indicated by a virtual line as in FIG. 2.

Figure 6:
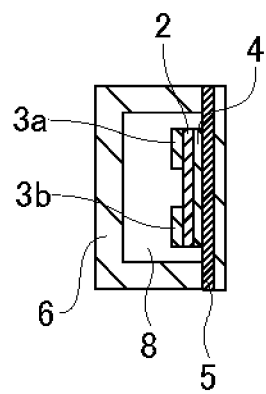
FIG. 6 is a cross-sectional view taken along line C-C, illustrating the configuration example (Example 2) of the corrosive environment monitoring sensor according to an embodiment of the present invention.

FIG. 6 is a cross-sectional view taken along line C-C in FIG. 5.

Figure 7:
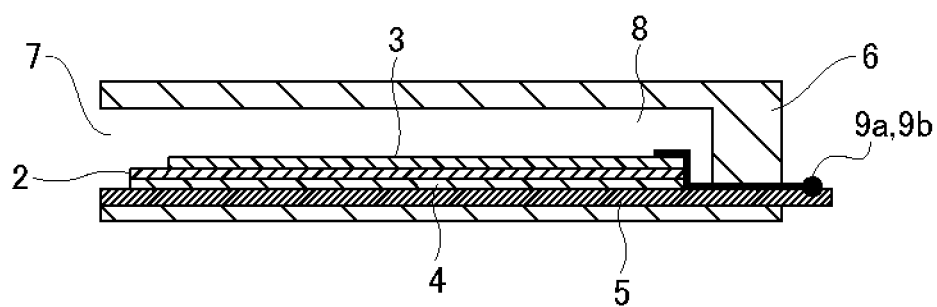
FIG. 7 is a cross-sectional view taken along line D-D, illustrating the configuration example (Example 2) of the corrosive environment monitoring sensor according to an embodiment of the present invention.

FIG. 7 is a cross-sectional view taken along line D-D in FIG. 5.

In the corrosive environment monitoring sensor 1 of Example 2 illustrated in FIGS. 5 to 7, the U-shaped base metal thin film 2 is formed on the substrate 5 via the insulating plate 4, similarly to the corrosive environment monitoring sensor 1 illustrated in FIGS. 2 to 4.

The corrosive environment monitoring sensor 1 of Example 2 illustrated in FIGS. 5 to 7 is different from the corrosive environment monitoring sensor 1 of Example 1 illustrated in FIGS. 2 to 4 in an arrangement configuration of sensing metal thin films 3a and 3b formed on the base metal thin film 2.

That is, in Example 2 of FIGS. 5 to 7, two sensing metal thin films 3a and 3b are prepared, and the two sensing metal thin films 3a and 3b are arranged on the base metal thin film 2 having two sides arranged in parallel except for an end of the base metal thin film 2 that is close to the opening 7. Therefore, as illustrated in FIG. 5, the base metal thin film 2 is exposed in the gas passage 8 at the end close to the opening 7.

Other configurations of the corrosive environment monitoring sensor 1 illustrated in FIGS. 5 to 7 are the same as those of the corrosive environment monitoring sensor 1 illustrated in FIGS. 2 to 4.

Figure 8:
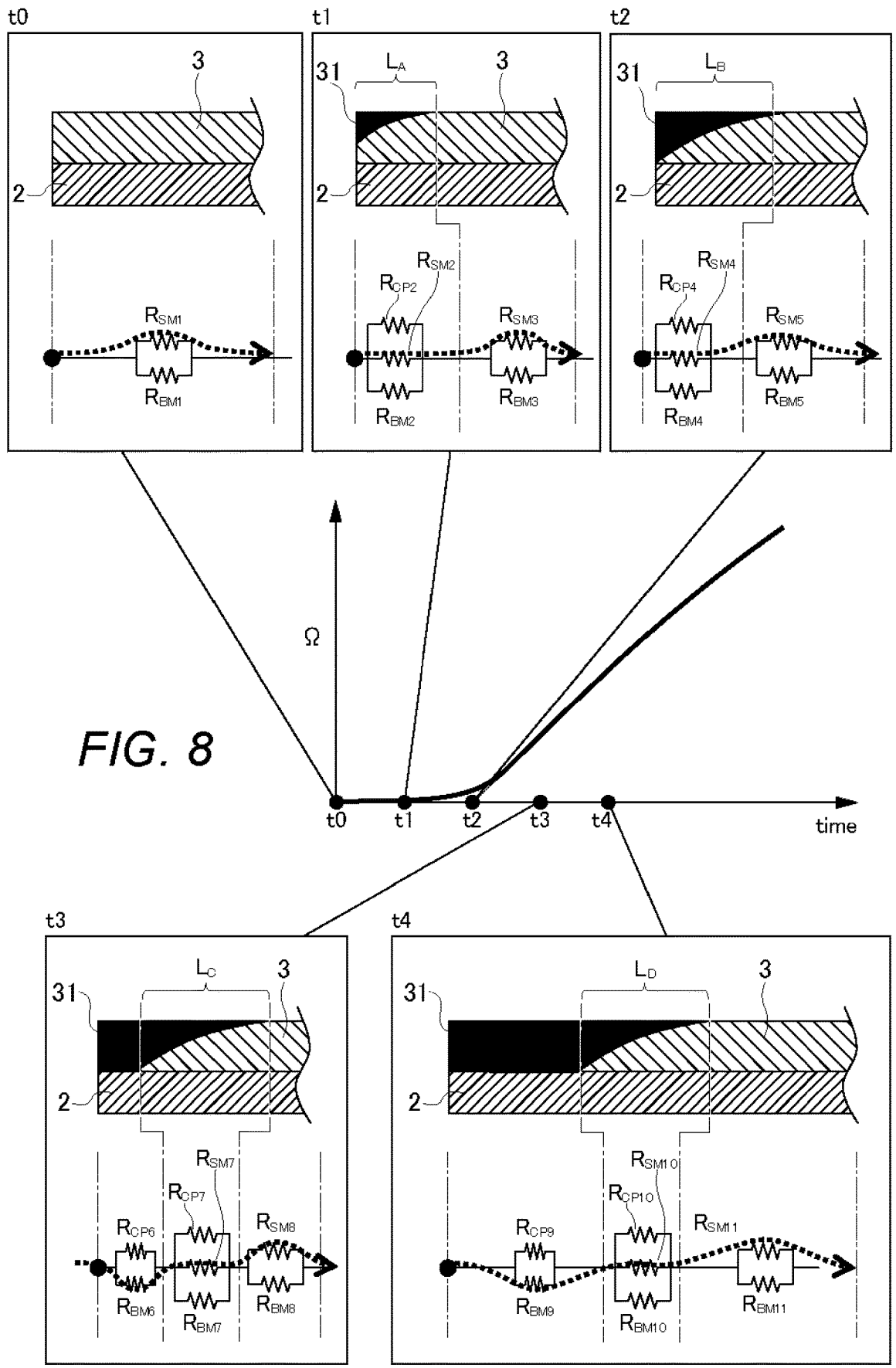
FIG. 8 is a diagram illustrating a principle in which an electric resistance of the corrosive environment monitoring sensor according to an embodiment of the present invention changes due to corrosion.

FIG. 8 illustrates a state in which the corrosive environment monitoring sensor 1 illustrated in Example 1 (FIGS. 2 to 4) or Example 2 (FIGS. 5 to 7) is exposed to the corrosive environment, corrosion progresses with the lapse of time, and a resistance value measured by the resistance value measurement unit 111 of the corrosive environment monitoring device 110 changes accordingly.

FIG. 8 illustrates a front view illustrating a corrosion state of the laminate including the base metal thin film 2 and the sensing metal thin film 3 (3a and 3b) at a time t0 before exposure, at a time t1 after exposure, at a time t2 after exposure, at a time t3 after exposure, and at a time t4 after exposure, and a relationship between an exposure time and the electric resistance value corresponding to the corrosion state. Here, the times t1 to t4 after exposure have a relationship of time t1 after exposure<time t2 after exposure<time t3 after exposure<time t4 after exposure.

In the sensor configuration of Example 1 (FIGS. 2 to 4) or Example 2 (FIGS. 5 to 7), the base metal thin film 2 and the sensing metal thin film 3 (3a and 3b) have a U-shape in which two sides are arranged in parallel, but in FIG. 8, the base metal thin film 2 and the sensing metal thin film 3 having an I-shape are arranged linearly in order to simplify the description. The resistance value in the graph illustrated in FIG. 8 is measured at both ends of the I-shaped base metal thin film 2.

Before exposure, neither the base metal thin film 2 nor the sensing metal thin film 3 is corroded.

An electric resistance value of the corrosive environment monitoring sensor 1 before exposure is indicated by a parallel circuit of an electric resistance $R_{BM1}$ of the base metal thin film 2 and an electric resistance $R_{SM1}$ of the sensing metal thin film 3.

Then, the electric resistance value of the corrosive environment monitoring sensor 1 before exposure is indicated by the electric resistance value (electric resistance $R_{SM1}$) of the sensing metal thin film 3 because a specific resistance of a sensing metal is higher than a specific resistance of a base metal.

At the time t1 after exposure after a certain period of time has elapsed from the exposure, the corrosive gas 10 existing in the environment forms a corrosion product 31 on an upper surface of the sensing metal thin film 3 that is in contact with the gas passage 8. Since the corrosive gas 10 enters from the opening 7 (left side) toward a depth side (right side) of the gas passage 8, the sensing metal thin film 3 is corroded from an opening 7 side where a concentration flux of the corrosive gas 10 is high.

At the time t1 after exposure, the corrosion product 31 is formed in a length $L_A$ at a left end of the sensing metal thin film 3, and only a part of the sensing metal thin film 3 remains at the left end.

When the length $L_A$ in which the corrosion product 31 is formed and the remaining length in which the corrosion product 31 is not formed are shown separately, the electric resistance value of the base metal thin film 2 is the sum of the electric resistance $R_{BM2}$ and the electric resistance $R_{BM3}$.

However, the electric resistance value of the sensing metal thin film 3 is different from a resistance value before exposure only in a portion corresponding to the length $L_A$ in which the corrosion product 31 is formed. That is, the portion corresponding to the length $L_A$ in which the corrosion product 31 is formed has a value obtained by connecting the electric resistance $R_{SM2}$ and an electric resistance $R_{CP2}$ of the corrosion product 31 in parallel. Therefore, the electric resistance value shown at the time t1 after exposure is indicated by an equivalent circuit in which a parallel resistance of the electric resistance $R_{BM2}$ the electric resistance $R_{SM2}$, and the electric resistance $R_{CP2}$ and a parallel resistance of the electric resistance $R_{BM3}$ and an electric resistance $R_{SM3}$ are connected in series as shown at the time t1 after exposure in FIG. 8.

The electric resistance value of the corrosive environment monitoring sensor 1 at the time t1 after exposure is determined as indicated by a dotted arrow on the equivalent circuit according to a magnitude relationship among the specific resistance of the base metal, the specific resistance of the sensing metal, and a specific resistance of the corrosion product 31. Therefore, the electric resistance value of the corrosive environment monitoring sensor 1 at the time t1 after exposure can be approximated by a series circuit (series resistance) of the electric resistance $R_{SM2}$ and the electric resistance $R_{SM3}$ of the sensing metal thin film 3. At the time t1 after exposure, since the sensing metal thin film 3 is present over the entire length, a change from the electric resistance value of the sensor chip before exposure is very small.

At the time t2 after exposure, since the corrosive gas 10 further enters from the opening 7 (left side) toward the depth side of the gas passage 8, the sensing metal thin film 3 is further corroded from the opening 7 where the concentration flux of the corrosive gas 10 is high.

At the time t2 after exposure, the corrosion product 31 is formed in a length $L_B$, the corrosion product 31 reaches a lower surface of the sensing metal thin film 3 at the left end of the sensing metal thin film 3, and the sensing metal thin film 3 does not remain at the left end of the sensing metal thin film 3.

An electric resistance value of the corrosive environment monitoring sensor 1 at the time t2 after exposure is indicated by an equivalent circuit of an electric resistance $R_{BM4}$ and an electric resistance $R_{BM5}$ of the base metal thin film 2, an electric resistance $R_{SM4}$ and an electric resistance $R_{SM5}$ of the sensing metal thin film 3, and an electric resistance $R_{CP4}$ of the corrosion product 31, similarly to the time t1 after exposure.

Then, the electric resistance value of the corrosive environment monitoring sensor 1 at the time t2 after exposure is a combined resistance of a route through which a current flows as indicated by a dotted arrow on the equivalent circuit according to a magnitude relationship among the specific resistance of the base metal, the specific resistance of the sensing metal, and the specific resistance of the corrosion product 31.

Therefore, the electric resistance value of the corrosive environment monitoring sensor 1 at the time t2 after exposure can be approximated by a series circuit (series resistance) of the electric resistance $R_{SM4}$ and the electric resistance $R_{SM5}$ of the sensing metal thin film 3.

The electric resistance value of the corrosive environment monitoring sensor 1 at the time t2 after exposure is slightly larger than that at the time t1 after exposure, but the change from the electric resistance value of the corrosive environment monitoring sensor 1 before exposure is still small.

From the time t2 after exposure, the change in electric resistance value of the corrosive environment monitoring sensor 1 increases.

At the time t3 after exposure after a certain period of time has elapsed from the time t2 after exposure, since the corrosive gas 10 further enters from the opening 7 (left side) toward the depth side of the gas passage 8, the sensing metal thin film 3 is corroded more badly from the opening 7 where the concentration flux of the corrosive gas 10 is high.

At the time t3 after exposure, the corrosion product 31 is formed to have a full thickness in a certain length of the sensing metal thin film 3, and the thickness is changed by a length $L_C$. The length $L_C$ is equal to the length $L_B$ of the corrosion product 31 at the time t2 after exposure.

An electric resistance value of the corrosive environment monitoring sensor 1 at the time t3 after exposure is indicated by an equivalent circuit of an electric resistance $R_{BM6}$, an electric resistance $R_{BM7}$, and an electric resistance $R_{BM8}$ of the base metal thin film 2, an electric resistance $R_{SM7}$ and an electric resistance $R_{SM8}$ of the sensing metal thin film 3, and an electric resistance $R_{CP6}$ and an electric resistance $R_{CP7}$ of the corrosion product 31, similarly to the time t1 after exposure.

Then, the electric resistance value of the corrosive environment monitoring sensor 1 at the time t3 after exposure is a combined resistance of a route through which a current flows as indicated by a dotted arrow on the equivalent circuit according to the following magnitude relationship among the specific resistance of the base metal, the specific resistance of the sensing metal, and the specific resistance of the corrosion product 31: the specific resistance of the corrosion product 31>the specific resistance of the base metal>the specific resistance of the sensing metal.

That is, the electric resistance value of the corrosive environment monitoring sensor 1 at the time t3 after exposure can be approximated by a series circuit of the electric resistance $R_{BM6}$ of the base metal thin film 2, and the electric resistance $R_{SM7}$ and the electric resistance $R_{SM8}$ of the sensing metal thin film 3.

Therefore, the electric resistance value of the corrosive environment monitoring sensor 1 at the time t3 after exposure changes relatively largely from the electric resistance value of the corrosive environment monitoring sensor 1 before the exposure.

An electric resistance value of the corrosive environment monitoring sensor 1 at the time t4 after exposure is indicated by an equivalent circuit of an electric resistance $R_{BM9}$, an electric resistance $R_{BM10}$, and an electric resistance $R_{BM11}$ of the base metal thin film 2, an electric resistance $R_{SM10}$ and an electric resistance $R_{SM11}$ of the sensing metal thin film 3, and an electric resistance $R_{CP9}$ and an electric resistance $R_{CP10}$ of the corrosion product 31.

Then, the electric resistance value of the corrosive environment monitoring sensor 1 at the time t4 after exposure is a combined resistance of a route through which a current flows as indicated by a dotted arrow on the equivalent circuit according to the above-described magnitude relationship among the specific resistance of the base metal, the specific resistance of the sensing metal, and the specific resistance of the corrosion product 31.

Therefore, the electric resistance value of the corrosive environment monitoring sensor 1 at the time t4 after exposure can be approximated by a series circuit (series resistance) of the electric resistance $R_{BM9}$ of the base metal thin film 2, and the electric resistance $R_{SM11}$ and the electric resistance $R_{SM11}$ of the sensing metal thin film 3.

At the time t4 after exposure, the corrosion product 31 is formed to have a full thickness in a certain length of the sensing metal thin film 3, and the thickness is changed by a length $L_D$. The length $L_D$ is equal to the length $L_C$ of the corrosion product 31 at a time t3 after exposure.

The electric resistance value of the corrosive environment monitoring sensor 1 at the time t4 after exposure is a relatively large change in which the resistance value increases substantially constantly every unit time as compared with the electric resistance value of the corrosive environment monitoring sensor 1 at the time t3 after exposure. However, as illustrated in FIGS. 9 and 10 to be described later, in a case where the exposure time is longer, the increase in electric resistance value is not linear.

<Change in Electric Resistance Depending on Gas Concentration>

As described with reference to FIG. 8, the electric resistance value of the corrosive environment monitoring sensor 1 of the present embodiment hardly changes until a certain period of time (the time t2 after exposure in FIG. 8) elapses after installation in the corrosive environment, and then gradually changes. In the following description, a period in which there is almost no change in electric resistance value is referred to as an incubation period.

Figure 9:
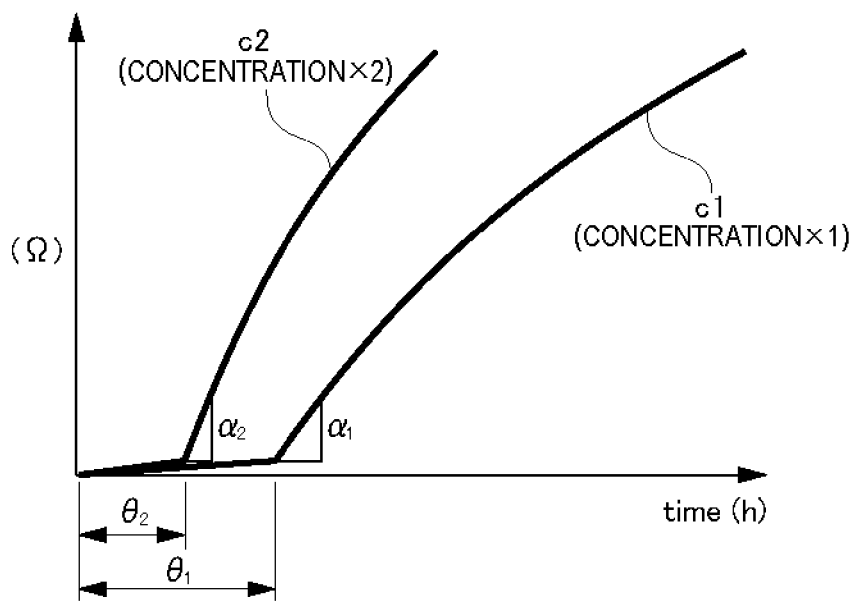
FIG. 9 is a diagram illustrating an example in which a change in electric resistance of the corrosive environment monitoring sensor according to an embodiment of the present invention differs depending on a gas concentration.
Figure 10:
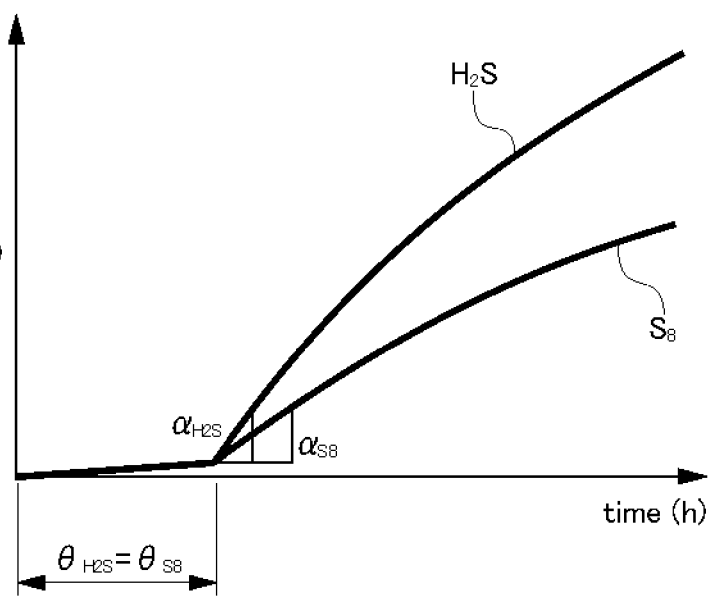
FIG. 10 is a diagram illustrating an example in which a change in electric resistance of the corrosive environment monitoring sensor according to an embodiment of the present invention differs depending on a corrosive substance.

FIG. 9 illustrates comparison between resistance value change characteristics c1 and c2 in a case where the type of a gas that causes corrosion is the same and only a concentration of the gas is different. Here, silver is used as the sensing metal thin film 3 of the corrosive environment monitoring sensor 1, and $H_2S$, $S_8$, and the like that corrode silver are used as gases that cause corrosion.

In FIG. 9, the resistance value change characteristic c1 indicates a state in which the gas concentration is one time (×1), and the resistance value change characteristic c2 indicates a state in which the gas concentration is two times (×2). In FIG. 9, the vertical axis represents an electric resistance value (Ω), and the horizontal axis represents time (h).

Here, the incubation period of the resistance value change characteristic c1 in a case where the gas concentration is one time is $\theta_1$, and a slope of the amount of change in resistance value after the lapse of the incubation period is a1. Further, the incubation period of the resistance value change characteristic c2 in a case where the gas concentration is two times is $\theta_2$, and a slope of the amount of change in resistance value after the lapse of the incubation period is $\alpha_2$.

At this time, the incubation periods $\theta_1$ and $\theta_2$ reflect the gas concentration. That is, when the incubation period $\theta_1$ at the gas concentration of one time is multiplied by 0.5, the incubation period $\theta_2$ at the gas concentration of two times is obtained. The slopes $\alpha_1$ and $\alpha_2$ of the amounts of change in resistance value also change in proportion to the gas concentration.

Therefore, even when the gas concentration changes, $\theta_1\alpha_1=\theta_2\alpha_2$ and a unique value is taken for each gas type.

<Change in Electric Resistance Depending on Gas Type>

FIG. 10 illustrates a state in which the electric resistance value changes depending on the gas type. In FIG. 10, the vertical axis represents an electric resistance value (Ω), and the horizontal axis represents time (h).

FIG. 10 illustrates characteristics of gas types $H_2S$ and $S_8$. Here, concentrations of both gases in the air are different, but incubation periods $\theta_{H2S}$ and $\theta_{S8}$ are equal to each other. Slopes $\alpha_{H2S}$ and $\alpha_{S8}$ of the amounts of change in resistance value after the lapse of the incubation periods of the gas type $H_2S$ and the gas type $S_8$ are different.

In the present embodiment, a gas type (corrosion-causing substance) that causes corrosion is identified using the fact that $\theta \times \alpha$, which is a product of an incubation period $\theta$ and a slope $\alpha$ of the amount of change in resistance value after the lapse of the incubation period, takes a unique value for each gas type.

<Example of Actual Analysis Data According to Gas Type>

Figure 11:
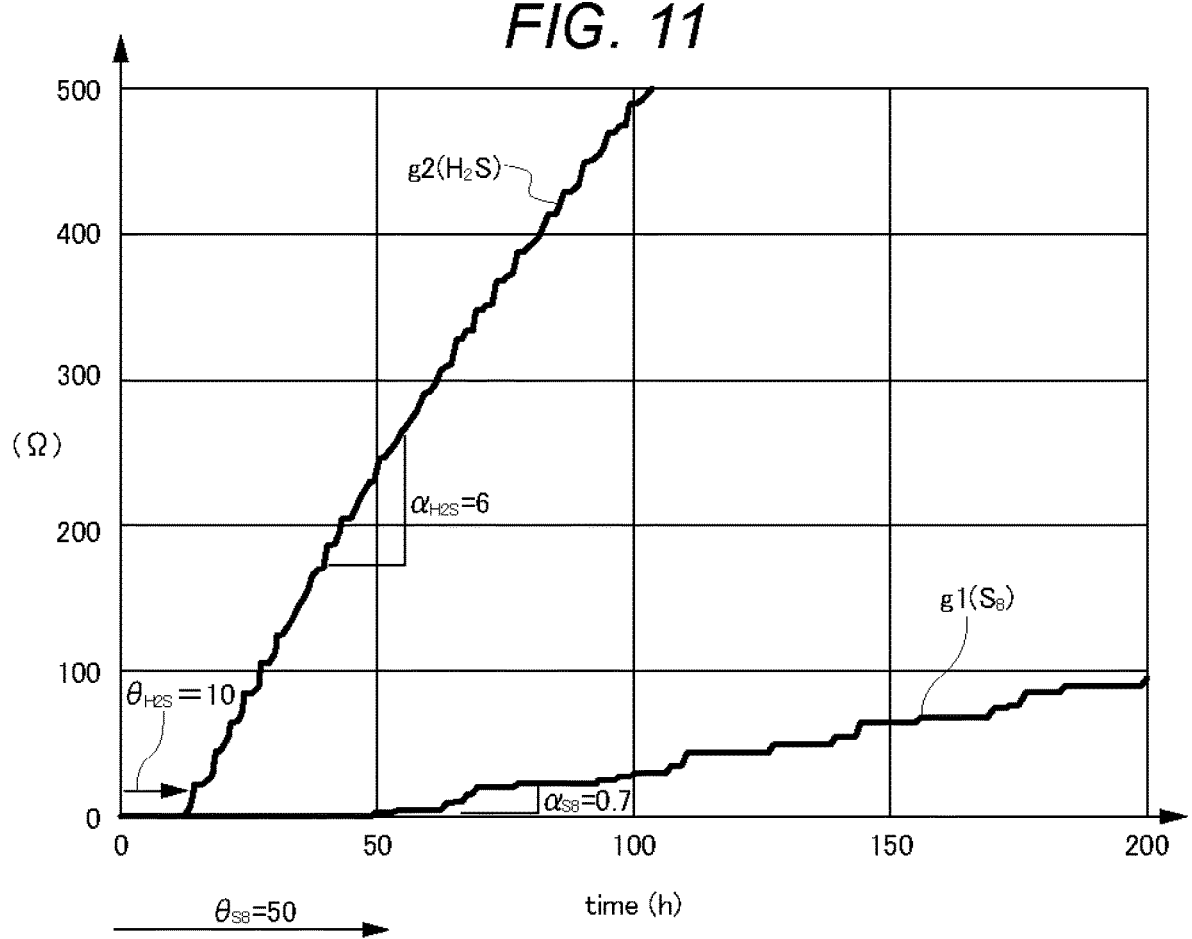
FIG. 11 is a diagram illustrating an example of analysis of the electric resistance of the corrosive environment monitoring sensor according to an embodiment of the present invention.

FIG. 11 illustrates an example of a change in electric resistance value analyzed in an environment of a gas g1 containing a corrosion-causing substance $S_8$ and an example of a change in electric resistance value analyzed in an environment of a gas g2 containing a corrosion-causing substance $H_2S$. In FIG. 11, the vertical axis represents an electric resistance value (Ω), and the horizontal axis represents time (h).

In the example of FIG. 11, an incubation period $\theta_{S8}$ of the gas g1 containing the substance $S_8$ is 50 hours (h), and a slope $\alpha_{S8}$ of the amount of change in resistance value after the lapse of the incubation period is 0.7 Ω/h.

On the other hand, an incubation period $\theta_{H2S}$ of the gas g2 containing the substance $S_{H2S}$ is 10 h, and a slope $\alpha_{H2S}$ of the amount of change in resistance value after the lapse of the incubation period is 6 Ω/h.

As described above, the slopes $\alpha_{H2S}$ and $\alpha_{S8}$ of the amounts of change in resistance value for the corrosion-causing substance $S_8$ and the corrosion-causing substance $H_2S$ are different, and the two corrosion-causing substances $S_8$ and $H_2S$ can be discriminated based on multiplied values of the slopes $\alpha_{H2S}$ and $\alpha_{S8}$ and the incubation periods $\theta_{H2S}$ and $\theta_{S8}$.

For example, when discriminating between the corrosion-causing substance $S_8$ and the corrosion-causing substance $H_2S$, the determination unit 112 of the corrosive environment monitoring device 110 sets a threshold th1 that is a value between a value x1 obtained by multiplying the slope $\alpha_{S8}$ of the amount of change in resistance value for the corrosion-causing substance $S_8$ by the incubation period $\theta_{S8}$ and a value x2 obtained by multiplying the slope $\alpha_{H2S}$ of the amount of change in resistance value for the corrosion-causing substance $H_2S$ by the incubation period $\theta_{H2S}$. Then, the determination unit 112 can determine whether the corrosion-causing substance $S_8$ or the corrosion-causing substance $H_2S$ is contained as the gas type by comparing the multiplied value obtained from the measurement data with the threshold th1.

In the example of FIG. 11, since the gas g1 containing the substance $S_8$ has the incubation period $\theta_{S8}$ of 50 h and the slope of the amount of change in resistance value of 0.7 Ω/h, the multiplied value of the gas g1 is 50×0.7=35. On the other hand, since the gas g2 containing the substance $S_{H2S}$ has the incubation period $\theta_{H2S}$ of 10 h and the slope $\alpha_{H2S}$ of the amount of change in resistance value of 6 Ω/h, the multiplied value of the gas g2 is 10×6=60.

Therefore, if the threshold th1 is set to a substantially intermediate value between 35 and 60, it is possible to determine whether the corrosion-causing substance contained in the gas is $S_8$ or $H_2S$.

<Processing in Determination Unit of Corrosive Environment Monitoring Device>

Figure 12:
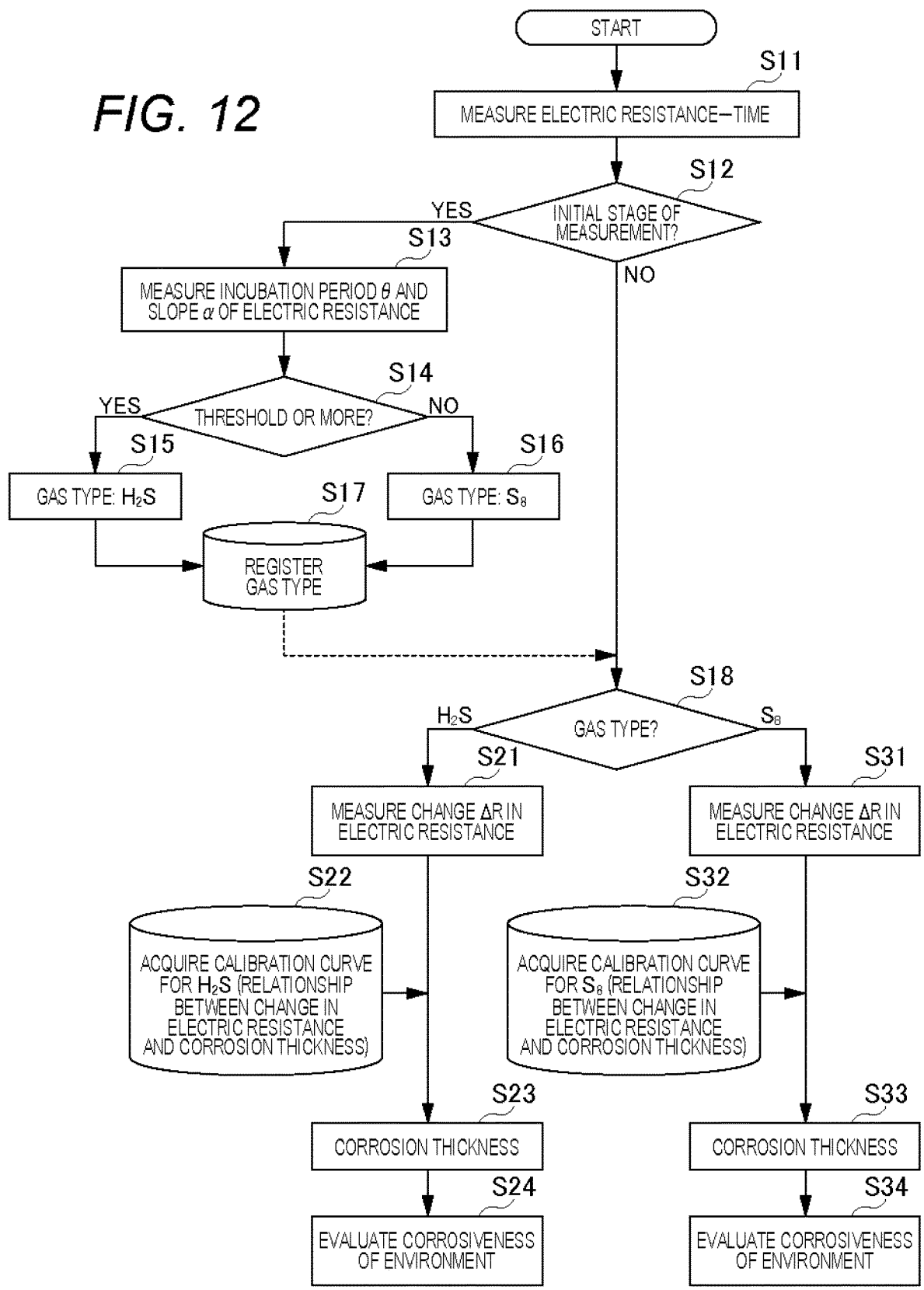
FIG. 12 is a flowchart illustrating an example of a flow of processing in the corrosive environment monitoring system according to an embodiment of the present invention.

FIG. 12 is a flowchart illustrating a flow of determination processing in the determination unit 112 of the corrosive environment monitoring device 110.

First, the resistance value measurement unit 111 of the corrosive environment monitoring device 110 measures the electric resistance value of the corrosive environment monitoring sensor 1, and stores measurement data and measurement time data in the storage unit 113 (step S11).

Then, the determination unit 112 determines whether or not the measurement data stored in the storage unit 113 is initial measurement data of the corrosive environment monitoring sensor 1 installed in the corrosive environment (step S12).

In a case where it is determined in step S12 that the measurement data is initial measurement data (YES in step S12), the determination unit 112 monitors the measurement data until an incubation period θ in which there is almost no change in resistance value and a slope a of the amount of change in electric resistance value after the lapse of the incubation period can be acquired, and measures the corresponding incubation period θ and the slope α of the amount of change (step S13).

Next, the determination unit 112 compares a multiplied value of the incubation period θ and the slope a of the amount of change with a preset threshold (step S14).

In a case where it is determined in step S14 that the multiplied value is equal to or greater than the preset threshold (YES in step S14), the determination unit 112 determines that the corrosion-causing substance $H_2S$ is contained as the gas type (step S15).

In a case where it is determined in step S14 that the multiplied value is less than the preset threshold (NO in step S14), the determination unit 112 determines that the corrosion-causing substance $S_8$ is contained as the gas type (step S16).

Then, the determination unit 112 performs registration processing of storing data of the gas type determined in step S15 or S16 in the storage unit 113 (step S17).

In a case where it is determined in step S12 that the measurement data is not the initial measurement data, that is, in a case where the gas type has already been registered (NO in step S12), the determination unit 112 determines whether the registered gas type is $S_8$ or $H_2S$ (step S18). Similarly, after the gas type is registered in step S17, the determination of the gas type in step S18 is performed.

In a case where it is determined in step S18 that the gas type is $H_2S$ ($H_2S$ in step S18), the determination unit 112 measures a change ΔR in electric resistance value (step S21). Then, the determination unit 112 acquires calibration curve data for the gas type $H_2S$ from the storage unit 113 (step S22). The calibration curve data for the gas type $H_2S$ is data indicating a relationship between the change in electric resistance value and a corrosion thickness of the sensing metal thin film 3 in a case of the gas type $H_2S$.

Further, the determination unit 112 calculates the corrosion thickness of the sensing metal thin film 3 based on the measured change ΔR in electric resistance value and the calibration curve data (step S23). As a result, the determination unit 112 evaluates the corrosiveness of the environment in which the corrosive environment monitoring sensor 1 is installed (step S24).

In a case where it is determined in step S18 that the gas type is $S_8$ ($S_8$ in step S18), the determination unit 112 measures the change ΔR in electric resistance value (step S31). Then, the determination unit 112 acquires calibration curve data for the gas type $S_8$ from the storage unit 113 (step S32). The calibration curve data for the gas type $S_8$ is data indicating a relationship between the change in electric resistance value and a corrosion thickness of the sensing metal thin film 3 in a case of the gas type $S_8$.

Further, the determination unit 112 calculates the corrosion thickness of the sensing metal thin film 3 based on the measured change ΔR in electric resistance value and the calibration curve data (step S33). As a result, the determination unit 112 evaluates the corrosiveness of the environment in which the corrosive environment monitoring sensor 1 is installed (step S34).

Note that the determination unit 112 in the corrosive environment monitoring device 110 may perform up to the calculation of the corrosion thickness in step S23 or S33, and the evaluation of the corrosiveness of the environment in which the corrosive environment monitoring sensor 1 is installed may be performed by an external information processing device that has acquired the data of the gas type and the corrosion thickness.

As described above, with the corrosive environment monitoring system 100 of the present embodiment, it is possible to evaluate the corrosiveness of the environment in which the corrosive environment monitoring sensor 1 is installed and to determine the type of the corrosive substance. In particular, since the type of the corrosive substance can be determined, it is possible to appropriately evaluate the corrosive environment, and it is possible to accurately diagnose the life against corrosion of the device installed in the corresponding place and the degree of corrosion resistance of the device. In addition, the incubation period in which the electric resistance hardly changes is used when determining the type of the corrosive substance, and thus, there is an effect that it is possible to accurately determine the type of the corrosive substance.

In addition, as monitoring is performed using the corrosive environment monitoring sensor 1 having the configuration illustrated in FIGS. 2 to 4, 5 to 7, and the like, corrosion of the sensing metal thin films 3, 3a, and 3b as described in FIG. 8 occurs, and it is possible to satisfactorily perform monitoring of the installation environment and determination of the corrosive substance. In particular, as the corrosive environment monitoring sensor 1 having a configuration in which the sensing metal thin films 3, 3a, and 3b and the base metal thin film 2 are formed in a U-shape is used, the incubation period in which the electric resistance hardly changes occurs depending on the type of corrosive substance, and the corrosive substance can be appropriately determined.

Further, as illustrated in FIGS. 5 to 7, the sensing metal thin films 3a and 3b are not arranged on the opening 7 side of the corrosive environment monitoring sensor 1, and only the base metal thin film 2 is exposed, so that the calculation of the incubation period in which the electric resistance hardly changes can be more accurately performed.

Modified Example

Note that the present invention is not limited to the embodiment described above, but includes various modified examples. For example, the above-described embodiment has been described in detail in order to explain the present invention in an easy-to-understand manner, and the present invention is not necessarily limited to those having all the configurations described.

For example, in the above-described embodiment, hydrogen sulfide ($H_2S$) and elemental sulfur ($S_8$) are determined as processing of determining the type of the corrosive substance, but the present invention is also applicable to an environment where other corrosive substances exist.

Specifically, the present invention is applicable to determination of carbonyl sulfide (OCS), carbon disulfide ($CS_2$), sulfur dioxide ($SO_2$), and the like, in addition to $H_2S$ and $S_8$. All of $H_2S$, $S_8$, OCS, $CS_2$, and $SO_2$ are gases that corrode silver, and silver can be applied as the sensing metal thin films 3, 3a, and 3b of the corrosive environment monitoring sensor 1. For example, in addition to the determination of $H_2S$ and $S_8$ described in the above-described embodiment, the determination of $H_2S$ and OCS may be performed.

Hydrogen sulfide ($H_2S$) is also generated in sewage and wastewater in addition to volcanoes. Elemental sulfur ($S_8$) is generated as outgas from a rubber and an adhesive. Carbonyl sulfide (OCS) and carbon disulfide ($CS_2$) are generated as a precursor of sulfuric acid aerosol derived from urban activities and outgas from wallpaper and flooring.

In addition, as illustrated in FIG. 1, the evaluation of the corrosive environment in the factory in which the control device 102 of the plant equipment 101 is installed is an example, and the present invention can be applied to evaluation of corrosiveness in other various environments. Specifically, the present invention can be applied to evaluation of corrosiveness in equipment in various social infrastructures such as a sewer systems, in addition to a manufacturing site and a transportation site.

Furthermore, in the corrosive environment monitoring system 100 illustrated in FIG. 1, the corrosive environment monitoring device 110 is connected to the outside via the network, and the evaluation of the corrosive environment is performed outside. However, all processing up to the evaluation may be performed in the corrosive environment monitoring device 110 to which the corrosive environment monitoring sensor 1 is connected.

Alternatively, at a place where the corrosive environment monitoring sensor 1 is installed, only the measurement of the resistance value may be performed, and the determination based on the change in resistance value may be performed outside.

In addition, the corrosive environment monitoring device 110 illustrated in FIG. 1 may be implemented by a computer that executes arithmetic processing based on a program (software) in addition to being implemented by dedicated hardware that performs monitoring processing.

However, in a case where the monitoring processing is executed by a computer, it is necessary to install a program for performing the resistance value measurement processing in the corrosive environment monitoring sensor and the determination processing of determining the type of the corrosive substance based on a change in resistance value over time in the computer.

In addition, in the block diagram of FIG. 1, only the control lines and information lines indicate those that are considered necessary for explanation, and do not necessarily indicate all the control lines and information lines in the product. In practice, it can be considered that almost all configurations are interconnected. Furthermore, in the flowchart illustrated in FIG. 12, a plurality of processings may be simultaneously executed or the processing order may be changed within a range not affecting the processing result.

REFERENCE SIGNS LIST 1 corrosive environment monitoring sensor
2 base metal thin film
3, 3a, 3b sensing metal thin film
4 insulating plate
5 substrate
6 housing
7 opening
8 gas passage
9 extraction electrode
9a, 9b terminal
10 corrosive gas
31 corrosion product
100 corrosive environment monitoring system
101 plant equipment
102 control device
110 corrosive environment monitoring device
111 resistance value measurement unit
112 determination unit
113 storage unit
120 monitoring center
121 display device

The invention claimed is:

1. A corrosive environment monitoring system comprising:
   a corrosive environment monitoring sensor that includes a laminate including an insulating plate, a base metal thin film formed on the insulating plate, and a sensing metal thin film formed in at least a partial region of the base metal thin film and formed of a metal that is more easily corroded by a corrosive substance compared to the base metal thin film and has a lower resistance value than the base metal thin film, and a housing that encloses the laminate, has an opening in a side surface direction, and has a gas passage for the corrosive substance inside;
   a resistance value measurement unit that detects an electric resistance between two points on the base metal thin film of the corrosive environment monitoring sensor; and
   a determination unit that determines a type of the corrosive substance based on a change in electric resistance measured by the resistance value measurement unit over time,
   wherein the determination unit determines the type of the corrosive substance by comparing a calculated value obtained by multiplying an incubation period in which the electric resistance hardly changes and a slope of a change in electric resistance per unit time after a lapse of the incubation period, with a preset threshold.

2. The corrosive environment monitoring system according to claim 1, wherein the determination unit further acquires calibration curve data indicating a relationship between a change in electric resistance and a corrosion amount of the sensing metal thin film according to the determined type of the corrosive substance, and evaluates an environment in which the corrosive environment monitoring sensor is installed based on a change in electric resistance measured by the resistance value measurement unit and calibration curve data.

3. The corrosive environment monitoring system according to claim 1, wherein the base metal thin film of the corrosive environment monitoring sensor have two sides arranged in parallel along a long side portion formed from an opening side of the housing toward a depth side of the gas passage, end portions of the base metal thin film having the two sides arranged in parallel are connected, the end portions being close to the opening, and terminals that detect the electric resistance are connected to ends of the base metal thin films having the two sides arranged in parallel, the ends being close to the depth side of the gas passage.

4. The corrosive environment monitoring system according to claim 3, wherein the sensing metal thin film is not formed at the end portions of the base metal thin film having the two sides arranged in parallel, the end portions being close to the opening.

5. A corrosive environment monitoring method for monitoring a corrosive environment by installing, at a predetermined place, a corrosive environment monitoring sensor that includes a laminate including an insulating plate, a base metal thin film formed on the insulating plate, and a sensing metal thin film formed in at least a partial region of the base metal thin film and formed of a metal that is more easily corroded by a corrosive substance compared to the base metal thin film and has a lower resistance value than the base metal thin film, and a housing that encloses the laminate, has an opening in a side surface direction, and has a gas passage for the corrosive substance inside, the corrosive environment monitoring method comprising:
   a resistance value measurement step of detecting an electric resistance between two points on the base metal thin film of the corrosive environment monitoring sensor; and
   a determination step of determining a type of the corrosive substance based on a change in electric resistance measured by the resistance value measurement processing over time and by comparing a calculated value obtained by multiplying an incubation period in which the electric resistance hardly changes and a slope of a change in electric resistance per unit time after a lapse of the incubation period, with a preset threshold.

* * * * *